US010922090B1

(12) United States Patent
Lieberman et al.

(10) Patent No.: US 10,922,090 B1
(45) Date of Patent: Feb. 16, 2021

(54) METHODS AND SYSTEMS FOR EXECUTING A SOFTWARE APPLICATION USING A CONTAINER

(71) Applicant: EMC IP Holding Company LLC, Hopkinton, MA (US)

(72) Inventors: Amit Lieberman, Raanana (IL); Jehuda Shemer, Kfar Saba (IL); Assaf Natanzon, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 217 days.

(21) Appl. No.: 15/726,977

(22) Filed: Oct. 6, 2017

(51) Int. Cl.
G06F 9/445 (2018.01)
G06F 9/50 (2006.01)
G06F 8/60 (2018.01)
G06F 8/70 (2018.01)

(52) U.S. Cl.
CPC ............ G06F 9/44505 (2013.01); G06F 8/60 (2013.01); G06F 9/5077 (2013.01); G06F 8/70 (2013.01)

(58) Field of Classification Search
CPC ............. G06F 11/1464; G06F 11/3433; G06F 16/252; G06F 8/60; G06F 9/445
See application file for complete search history.

(56) References Cited

U.S. PATENT DOCUMENTS

| | | | |
|---|---|---|---|
| 9,690,622 B1* | 6/2017 | Argenti | G06F 9/5027 |
| 10,191,778 B1* | 1/2019 | Yang | G06Q 30/0283 |
| 10,244,034 B2* | 3/2019 | Joshi | H04L 41/5035 |
| 10,554,690 B2* | 2/2020 | DeLuca | H04L 63/20 |
| 2017/0116334 A1* | 4/2017 | Kruglikov | G06F 16/21 |
| 2017/0118137 A1* | 4/2017 | Nanjundaswamy | H04L 67/42 |
| 2017/0180346 A1* | 6/2017 | Suarez | G06F 8/71 |
| 2017/0199770 A1* | 7/2017 | Peteva | G06F 9/5088 |
| 2017/0249374 A1* | 8/2017 | Parees | G06F 9/44 |
| 2018/0137174 A1* | 5/2018 | Cahana | G06F 16/252 |
| 2018/0191779 A1* | 7/2018 | Shieh | H04L 63/1425 |
| 2018/0357447 A1* | 12/2018 | Chen | G06F 11/1464 |
| 2019/0034460 A1* | 1/2019 | Eberlein | H04L 41/5041 |

* cited by examiner

*Primary Examiner* — Duy Khuong T Nguyen
(74) *Attorney, Agent, or Firm* — Womble Bond Dickinson (US) LLP (57) ABSTRACT

Systems and methods for running an application program on a database host is disclosed. According to some embodiments, the system comprises an agent installed on the database host. The system further comprises an application engine installed on an application server. The application engine is configured to create and deploy the agent to the database host to be installed. The agent is configured to command a daemon installed on the database host to download a container image of the application program based on a container image name received from the application server.

6 Claims, 5 Drawing Sheets

METHODS AND SYSTEMS FOR EXECUTING A SOFTWARE APPLICATION USING A CONTAINER

FIELD OF THE INVENTION

Embodiments of the present invention relate generally to data storage systems. More particularly, embodiments of the invention relate to methods and systems for executing a software application using a container.

BACKGROUND

Modern database systems, for example relational database management system (RDBMS), generally support stored procedures. A stored procedure (.stored) is referred to a named collection of structured query language (SQL) statements and procedural logic (e.g., compiled, verified, and stored) in a database system, such as a server database. Stored procedures are generally effective when an application system (e.g., a server) needs to iterate over a large amount of data in order to perform computation. For example, instead of transferring a large amount of data over a network (which may impose significant restraints on the system), a software or application program may run on the database system itself and send the results to the application system for processing.

However, while there is a standard language (e.g., SQL) to access databases remotely, the database implementations and the languages used for stored procedures are largely proprietary and different among database technologies. Therefore, such may impose challenges that include the need to train developers with a new language for each database, the inability to migrate a software or application program written for a specific database to another database, the inability to implement a software or application program that supports different backend databases, and duplications of object models, serialization code, and verifications for applications that are written in different programming languages.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

With the introduction of containers, it is now possible to encapsulate an application program within a container and pass the container to different database hosts to run the application program. The container, for example, may contain an instance of the program (e.g., a binary file) written in any language, with the program using a standard language (e.g., SQL) to access a database within a database host. Database hosts may support running such container natively, and even if not, an agent may be installed to run on a database host and connect to the database of the database host.

According to one aspect of the invention, a method for running an application program on a database host receives a container image name from an application server. The method communicates with a daemon installed on the database host to retrieve a container image of the application program based on the container image name. The daemon is configured to start a container having an instance of the container image. The instance runs on the database host using the container that communicates one or more outputs generated by the instance to the application server.

According to another aspect of the invention, a method for running an application program on a database host deploys an agent to the database host, where the agent is installed on the database host. The method sends to the agent a container image name. The agent is configured to command a daemon installed on the database host to download a container image of the application program based on the container image name.

According to another aspect of the invention, a system includes an agent installed on the database host. The system further comprises an application engine installed on an application server. The application engine is configured to create and deploy the agent to the database host to be installed. The agent is configured to command a daemon installed on the database host to download a container image of the application program based on a container image name received from the application server.

Figure 1:
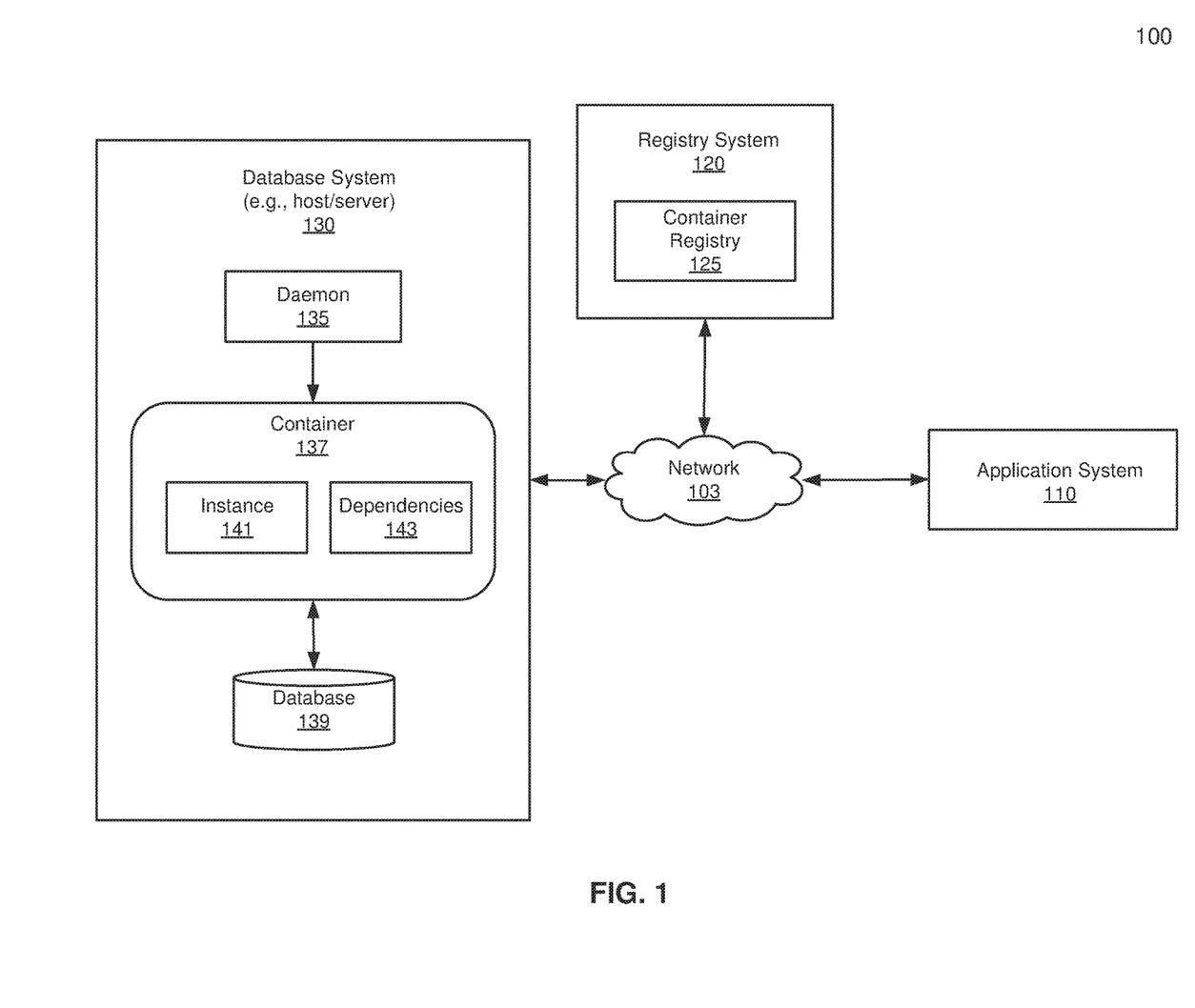
FIG. 1 is a block diagram illustrating a system for running an application program on a database system according to one embodiment of the invention.

FIG. 1 is a block diagram illustrating a system for running an application program on a database system according to one embodiment of the invention. Referring to FIG. 1, system 100 includes, but is not limited to, an application system 110, a registry system 120 and a database system 130 that are communicatively coupled to each other via network 103. Registry system 120 and database system 130 may be any type of systems such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, a fiber network, a storage network, or a combination thereof, wired or wireless. Application system 110 may be located in proximity to one, both, or neither of registry system 120 and database system 130.

Application system 110 may include or represent any type of servers or a cluster of one or more servers (e.g., cloud servers). For example, application system 110 may be an application server used for various different purposes, such as to provide the facilities to create application programs (e.g., container images) and an environment to run those application programs. Thus, application system 110 may include components such as web server connectors, computer programming languages, runtime libraries, database connectors, and/or the administration code needed to deploy, configure, manage, and/or connect these components. In some embodiments, application system 110 may act as a set of components accessible to a developer through an application program interface (API) defined for a platform. In some embodiments, application system 110 may implement services, such as clustering, fail-over, and load-balancing to facilitate a developer in implementing a specific application program (or business logic). In some embodiments, application server 110 may represent a virtual machine for running applications and handling connections to a database and one or more clients.

Registry system 120 allows a user to store and distribute software images. For example, a developer may create a container image (i.e., application program) on application system 110 or any other system (e.g., a host, personal computer, a "thin" client, a personal digital assistant (PDA), a Web enabled appliance, a mobile device, etc.) and upload the image to registry system 120. Registry system 120 stores the image in container registry 125, which is a repository for storing container images. After the image is stored in container registry 125, the image may be distributed by allowing other systems (e.g., hosts) to download it from registry system 120. In some embodiments, registry system 120 may include a registry service that allows a user to link to code repositories, build and test images, store the images to container registry 125, and/or deploy the images to other systems. Such registry service, for example, may be Docker Hub, Quay, Amazon EC2 Container Registry (ECR), Google Container Registry, or any other registry service.

As shown, database system 130 includes a database 139 and may serve to generate and manage database 139. Generally, database system 130 serves as an interface between database 139 and a user (or application programs) to ensure that data is consistently organized and remains accessible. In some embodiments, database system 130 provides various operations for a user to access database 139. For example, database system 130 may enable a user to create, read, update, and delete data in database 139. In one embodiment, database system 130 may include a database engine (not shown) and a database schema (also not shown). The database engine for example may allow data to be accessed, locked and/or modified. The database schema for example may define the logical structure of database 139. In some embodiments, database system 130 may offer logical and physical data independence. That is, it may protect users and applications from needing the knowledge of where data is stored or having to be concerned about changes to the physical structure of the data (e.g., storage and hardware). For example, by using an API (e.g., SQL) for database 139 that is provided by database system 130, a user does not have to modify an application program due to the changes being made to database 139. In some embodiments, database system 130 may be an RDBMS, in-memory database management system (IMDBMS), columnar database management system (CDBMS), or cloud-based data management system. In some embodiments, database system 130 may operate on a Linux, Unix, Windows, Mac, or any other suitable operating system.

As illustrated in FIG. 1, a daemon 135 (e.g., Docker daemon) may be installed on database system 130. Daemon 135 may communicate with a client (not shown), e.g., Docker client, installed on application server 110 and/or database system 130 to start or create container 137 on database system 130. For example, in one embodiment, a user or application program of application system 110 (or database system 130) may run commands, via the client, to provide a container image name or identifier (ID) to daemon 135. Upon receiving the container image name, daemon 135 determines whether it contains a container image (i.e., application program) having the container image name. If it is determined that daemon 135 does contain the container image, daemon 135 may start container 137 using the image. Otherwise, daemon 135 may retrieve or receive the image from registry 125 of registry system 120 via network 103. Daemon 135 may cache the image and communicate with an operating system running on database system 130 to manipulate the tools needed as part of the operating system's kernel to start container 137 based on the image. In some embodiments, container 137 may include an instance 141 of the container image and dependencies 143 (such as libraries, frameworks, binaries, and configuration files) to natively run instance 141 (i.e., application function) on database system 130 using container 137.

Generally, when container 137 is launched on database system 130 to run the instance 141 on database system 130 using container 137, it shares the kernel of the operating system running on database system 130. Moreover, container 137 may allow processes and resources, such as central processing unit (CPU), memory, block input/output (TO), and networking properties, to be isolated from database system 130 and any other containers. In some embodiments, in running instance 141 on database system 130, instance 141 may connect to and retrieve data from database 139 (e.g., using API for database 139), process the data, and generate results based on the data. The results may be communicated to application system 110 (as discussed in more detail herein below) via network 103. In some embodiments the results may be stored as an extensible markup language (XML) file, text file, binary file, or any suitable type of file.

Figure 2:
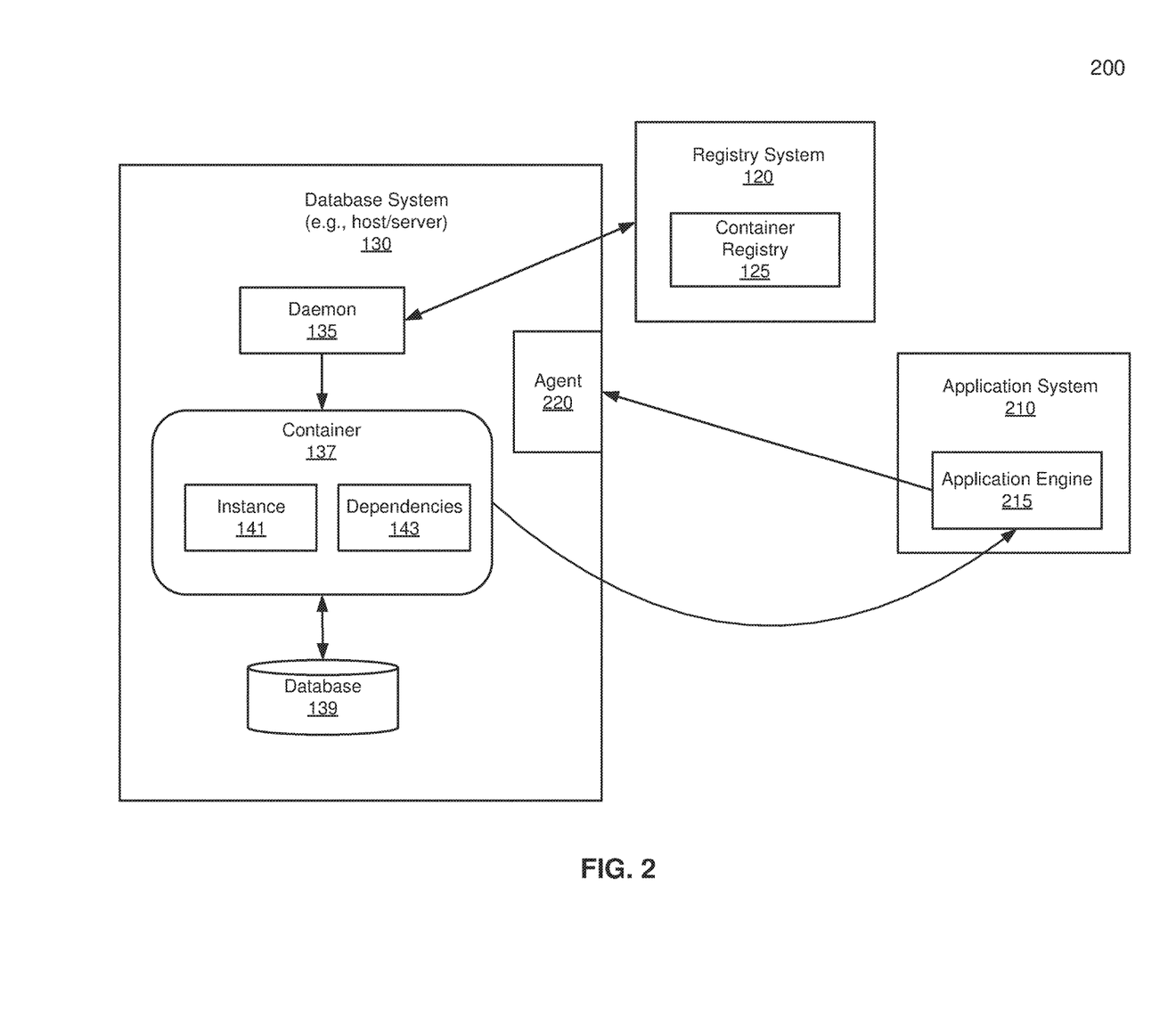
FIG. 2 is a block diagram illustrating another system for running an application program on a database system according to one embodiment of the invention.

FIG. 2 is a block diagram illustrating another system for running an application program on a database system according to one embodiment of the invention. Referring to FIG. 2, system 200 includes registry system 120 having container registry 125, and database system 130 (which are previously described with respect to FIG. 1), and for brevity sake, are not described again. As shown, system 200 further includes application system 210. In some embodiments, application system 210 may be application system 110 (which is previously described with respect to FIG. 1), and for brevity sake, is not described again. Thus, application system 210 may include or represent any type of servers or a cluster of one or more servers (e.g., cloud servers). For example, application system 210 may be an application server used for various different purposes, such as to provide the facilities to create application programs (e.g., container images) and an environment to run those application programs, as previously described.

In some embodiments, application system 210 may include application engine 215. Application engine 215 may serve to create and deploy software agent 220 to database system 130 such that agent 220 can be installed on database system 130 to communicate with application engine 215. Agent 220 for example is a computer program that performs one or more specific tasks for a user or other program. In one embodiment, agent 220 may receive a container image name from application engine 215 to retrieve a container image of an application program. In doing so, in one embodiment agent 220 may command daemon 135 via a client (not shown) to download a container image having the container image name from container registry 125 of registry system 120. Alternatively, in another embodiment agent 220 may download the container image from container registry 125. As previously described, daemon 135 may cache the image and communicate with an operating system running on database system 130 to manipulate the tools needed as part of the operating system's kernel to start container 137 on database system 130, which may include instance 141 and dependencies 143 to natively run instance 141 (i.e., application function) on database system 130 using container 137.

In some embodiments, agent 220 may run commands to launch container 137 to natively run instance 141 (i.e., application function) on database system 130 using container 137, while granting instance 141 access to database 139 on database system 130. For example, agent 220 may input the credentials of database 139 as an environment variable of an environment, in which instance 141 runs, in order for instance 141 to connect to database 139 and upload a container binary using the database credentials. Container 137 may expect a local host, for example called "database", and connect to the host without requiring credentials, as the credentials has been provided by instance 141. While instance 141 is running, it may access data (e.g., query, create, read, update, or delete) in database 139 to perform specific functions or tasks. In performing the tasks, outputs or results may be generated and container 137 may communicate the outputs to application engine 215 for processing and analysis of the outputs. To communicate the outputs to application engine 215, agent 220 may provide the location of application system 210, for example an internet protocol (IP), to container 137. In some embodiments, agent 220 may not be required to install on database system 130. For example, a database vendor may implement a native protocol support such that database system 130 can support launching or running container 137 natively.

In some embodiments, by running instance 141 on database system 130, instance 141 may cache query results between calls to avoid having to transfer data over a network (e.g., network 103 of FIG. 1). In some embodiments, agent 220 may duplicate container 137 using the downloaded container image in order to run more than one instance of the container image in parallel. This, for example, may overcome the limitation of stored procedures, which are serial in nature.

Figure 3:
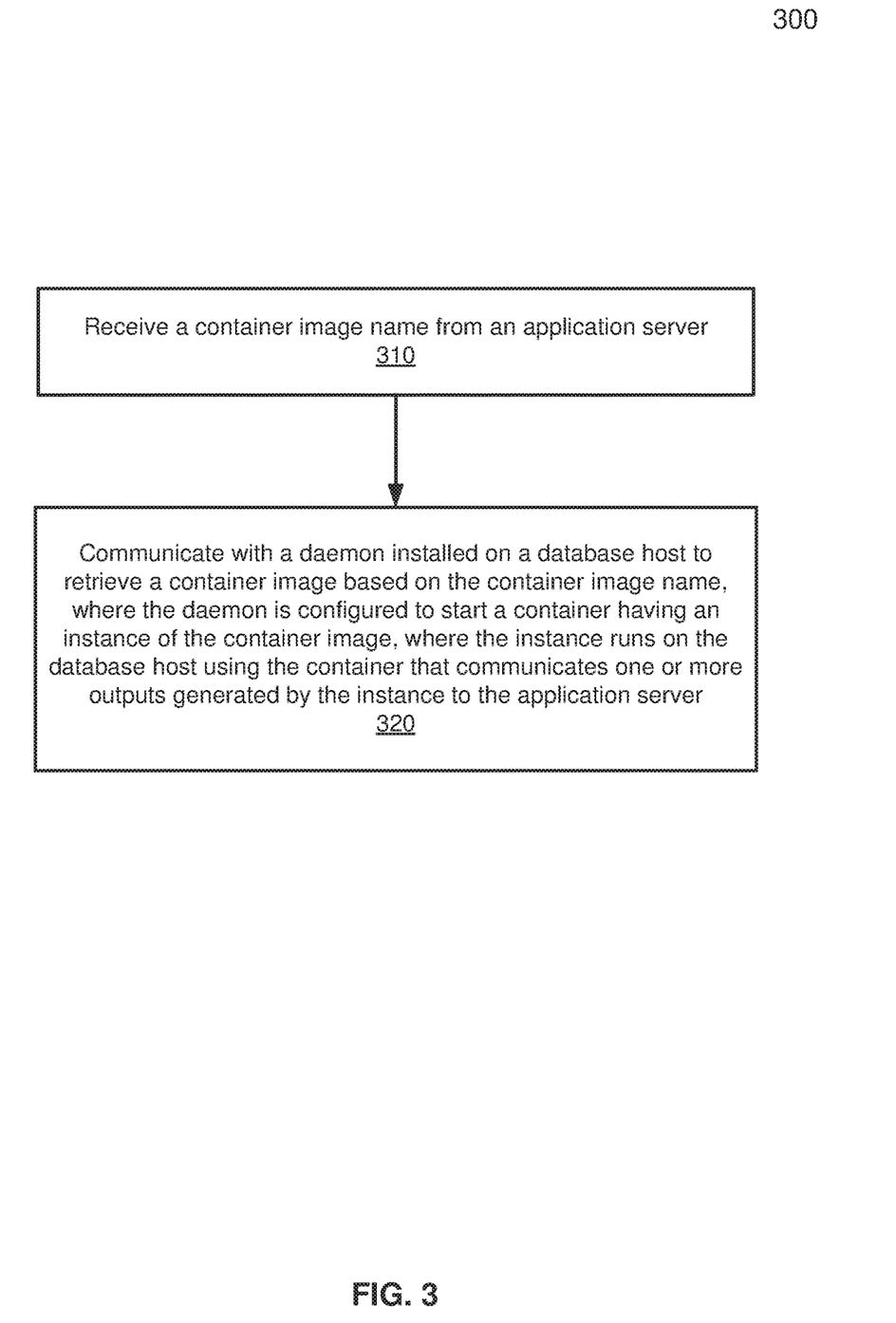
FIG. 3 is a flow diagram of a method for running an application program on a database system according to one embodiment of the invention.

FIG. 3 is a flow diagram of a method for running an application program on a database system according to one embodiment of the invention. Process 300 may be performed by processing logic that includes hardware (e.g. circuitry, dedicated logic, etc.), software (e.g., embodied on a non-transitory computer readable medium), or a combination thereof. For example, process 300 may be performed by agent 220 of FIG. 2.

Referring to FIG. 3, at block 310, the processing logic receives a container image name from an application server. At block 320, the processing logic communicates with a daemon installed on a database host to retrieve a container image based on the container image name. The daemon is configured to start a container having an instance of the container image. The instance runs on the database host using the container that communicates one or more outputs generated by the instance to the application server.

Figure 4:
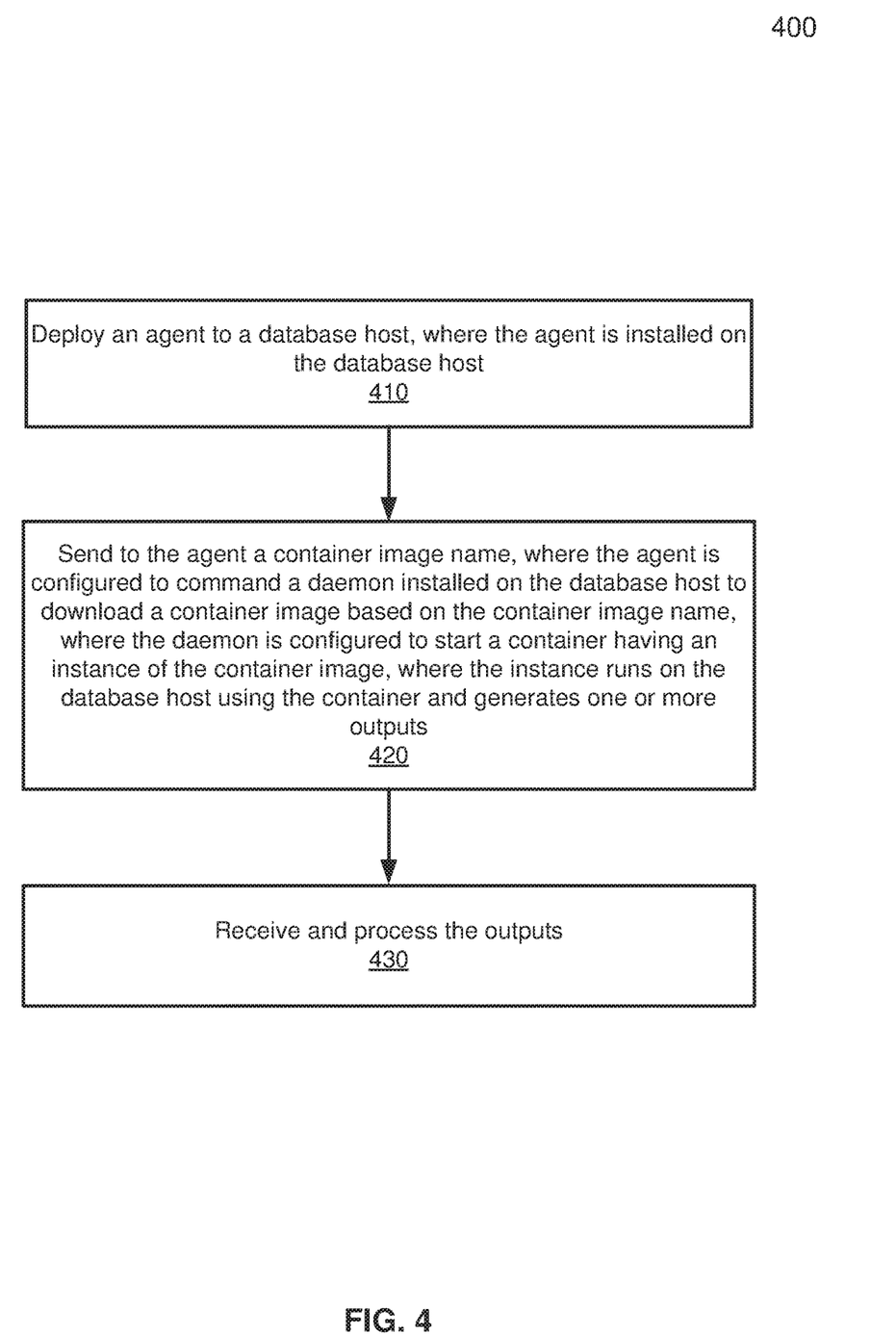
FIG. 4 is a flow diagram of another method for running an application program on a database system according to one embodiment of the invention.

FIG. 4 is a flow diagram of another method for running an application program on a database system according to one embodiment of the invention. Process 400 may be performed by processing logic that includes hardware (e.g. circuitry, dedicated logic, etc.), software (e.g., embodied on a non-transitory computer readable medium), or a combination thereof. For example, process 400 may be performed by application engine 215 of FIG. 2.

Referring to FIG. 4, at block 410, the processing logic deploys an agent to a database host, where the agent is installed on the database host. At block 420, the processing logic sends to the agent a container image name. The agent is configured to command a daemon installed on the database host to download a container image based on the container image name. The daemon is configured to start a container having an instance of the container image. The instance runs on the database host using the container and generates one or more outputs. At block 430, the processing logic receives and process the outputs.

Note that some or all of the components as shown and described above (e.g., application engine 215 of FIG. 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
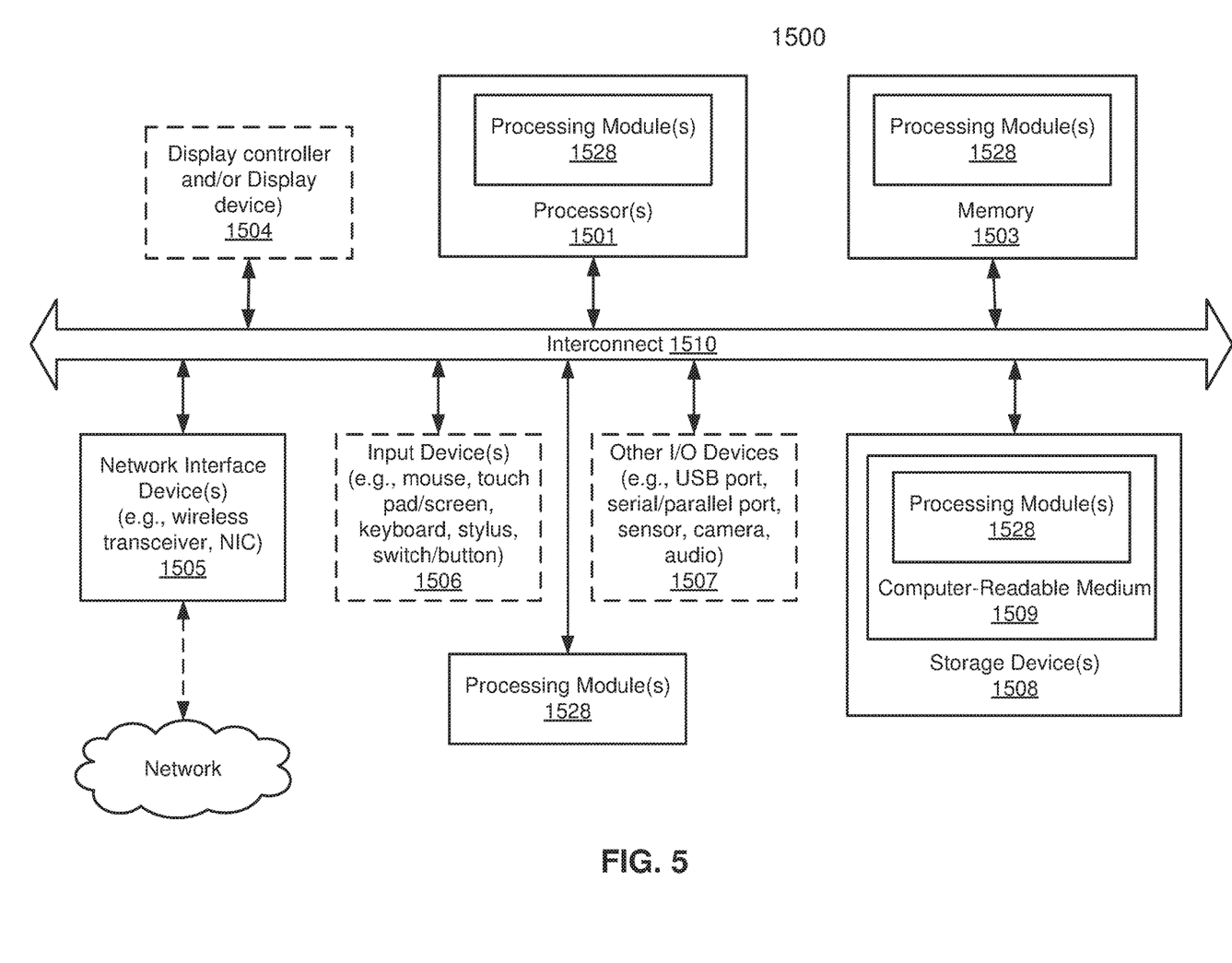
FIG. 5 is a block diagram illustrating a data processing system according to one embodiment.

FIG. 5 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for running an application program on a database host, the method comprising:
   receiving a container image name from an application server;
   communicating with a daemon installed on the database host to command the daemon to retrieve a container image of the application program based on the container image name, wherein the daemon is configured to:
      determine whether the daemon includes the container image,
      retrieve the container image from a container registry of a registry server in response to determining that the daemon does not include the container image, start a container from the container image, the container comprising an instance of the application program, wherein the container includes dependencies to natively run the instance of the application program on the database host, and wherein the instance of the application program runs within the container natively on the database host to query data from a database of the database host and generate one or more outputs based on the queried data, and
      the container communicates one or more outputs generated by the instance of the application program to the application server;
   inputting credentials of the database as an environment variable of an environment in which the instance of the application program runs to provide the instance of the application program running within the container access to a database within the database host; and
   duplicating the container using the container image to start a second container, the container and the second container to execute instances of the application program in parallel.

2. The method of claim 1, further comprising:
   providing a location of the application server to the container to communicate the outputs generated by the instance of the application program to the application server.

3. A computer-implemented method for running an application program on a database host, the method comprising:
   deploying, by an application server, an agent to the database host, wherein the agent is installed on the database host;
   sending to the agent, from the application server, a container image name, wherein the agent is configured to command a daemon installed on the database host to download a container image of the application program based on the container image name, wherein the daemon is configured to:
      determine whether the daemon includes the container image,
      download the container image from a container registry of a registry server in response to determining that the daemon does not include the container image,
      start a container from the container image, the container comprising an instance of the application program, wherein the container includes dependencies to natively run the instance of the application program on the database host, and wherein the instance of the application program runs within the container natively on the database host to query a database of the database host and to generate one or more outputs based on the queried data, and
      duplicate the container using the container image to start a second container, the container and the second container to execute instances of the application program in parallel; and
   receiving and processing the outputs from the container by the application server, wherein the agent is further configured to input credentials of the database as an environment variable of an environment in which the instance of the application program runs to provide the instance of the application program running within the container access to a database within the database host.

4. The method of claim 3, wherein the agent is further configured to provide a location of the application server to the container to communicate the outputs generated by the instance of the application program to the application server.

5. A system for running an application program on a database host, the system comprising:
   a processor-based database host;
   a processor-based application server;
   an agent installed on the database host; and
   an application engine installed on the application server, the application engine configured to create and deploy the agent to the database host to be installed;
   wherein the agent is configured to command a daemon installed on the database host to download a container image of the application program based on a container image name received from the application server, wherein the daemon is configured to
      determine whether the daemon includes the container image,
      download the container image from a container registry of a registry server in response to determining that the daemon does not include the container image,
      start a container from the container image, the container comprising an instance of the application program, wherein the container includes dependencies to natively run the instance of the application program on the database host, and wherein the instance of the application program runs in the container natively on the database host to query data from a database of the database host and to generate one or more outputs based on the queried data, and
   the application engine is configured to receive and process the outputs from the container, and wherein the agent is further configured to input credentials of the database as an environment variable of an environment in which the instance of the application program runs to provide the instance of the application program access to a database within the database host.

6. The system of claim 5, wherein the agent is further configured to provide a location of the application server to the container to communicate the outputs to the application engine.

* * * * *